(12) United States Patent
Utsumi (10) Patent No.: US 12,023,964 B2
(45) Date of Patent: Jul. 2, 2024

(54) PNEUMATIC TIRE

(71) Applicant: Sumitomo Rubber Industries, Ltd., Kobe (JP)

(72) Inventor: Daisuke Utsumi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 17/543,766

(22) Filed: Dec. 7, 2021

(65) Prior Publication Data

US 2022/0203779 A1 Jun. 30, 2022

(30) Foreign Application Priority Data

Dec. 24, 2020 (JP) .................................. 2020-215292

(51) Int. Cl.
- *B60C 13/00* (2006.01)
- *B60C 1/00* (2006.01)
- *B60C 13/02* (2006.01)

(52) U.S. Cl.
CPC .......... *B60C 13/001* (2013.01); *B60C 1/0025* (2013.01); *B60C 13/02* (2013.01)

(58) Field of Classification Search
CPC . B60C 13/001; B60C 13/02; B60C 2013/045; B60C 1/0025
See application file for complete search history.

(56) References Cited

U.S. PATENT DOCUMENTS

| 2,566,328 | A | | 9/1951 | Hessney et al. |
| 4,967,820 | A | * | 11/1990 | McCarthy ............... B60C 13/02 |
| | | | | 152/DIG. 12 |
| 5,714,022 | A | | 2/1998 | Nagao et al. |
| 5,769,976 | A | * | 6/1998 | Omokawa ............... B60C 11/01 |
| | | | | 156/130.7 |

(Continued)

FOREIGN PATENT DOCUMENTS

| CN | 103347711 A | * 10/2013 | ........... B32B 25/042 |
| CN | 113815352 A | * 12/2021 | ......... B60C 15/0009 |

(Continued)

OTHER PUBLICATIONS

Machine Translation JP 2020069941.*

(Continued)

*Primary Examiner* — Katelyn W Smith
*Assistant Examiner* — Wendy L Boss
(74) *Attorney, Agent, or Firm* — XSENSUS LLP (57) ABSTRACT

A pneumatic tire can include a tread portion, a pair of sidewall portions, bead portions, and a carcass. At least one sidewall portion can include a first sidewall rubber arranged outside the carcass in a tire axial direction. The first sidewall rubber can include a different color rubber layer and a barrier rubber layer. The different color rubber layer can have a color different from a basic color of an outer surface of the at least one sidewall portion. At least a part of the different color rubber layer can be exposed in the outer surface of the at least one sidewall portion. The barrier rubber layer can be arranged between the different color rubber layer and the (Continued)

carcass. The barrier rubber layer can include a first portion having a rubber compounding to suppress migration of rubber compounding agents on the carcass side to the different color rubber layer.

18 Claims, 3 Drawing Sheets

(56) References Cited

U.S. PATENT DOCUMENTS

| | | | | |
|---|---|---|---|---|
| 11,529,829 | B2* | 12/2022 | Kubo | B29D 30/48 |
| 2014/0326386 | A1* | 11/2014 | Sato | B60C 1/0025 |
| | | | | 152/525 |
| 2015/0306919 | A1* | 10/2015 | Tokutake | B60C 13/00 |
| | | | | 152/524 |
| 2019/0263196 | A1* | 8/2019 | Kawakami | B60C 13/001 |
| 2021/0094351 | A1* | 4/2021 | Nishijima | B60C 15/06 |
| 2021/0197627 | A1* | 7/2021 | Nakano | B60C 13/001 |
| 2021/0324180 | A1* | 10/2021 | Dall'Abaco | B60C 1/0025 |

FOREIGN PATENT DOCUMENTS

| | | | | |
|---|---|---|---|---|
| DE | 10 2006 058 844 A1 | 6/2008 | | |
| EP | 2 674 305 A1 | 12/2013 | | |
| JP | 2006168616 A | * | 6/2006 | |
| JP | 2012131283 A | * | 7/2012 | |
| JP | 2014213688 A | * | 11/2014 | B60C 13/002 |
| JP | 2015107593 A | * | 6/2015 | |
| JP | 2016-203420 A | | 12/2016 | |
| JP | 2020069941 A | * | 5/2020 | |
| WO | WO-2016176353 A1 | * | 11/2016 | B29C 65/52 |
| WO | 2020/090758 A1 | | 5/2020 | |

OTHER PUBLICATIONS

Machine Translation CN 113815352.*
CN 103347711 Machine Translation (Year: 2013).*
JP 2006168616 Machine Translation (Year: 2006).*
JP 2012131283 Machine Translation (Year: 2012).*
JP-2015107593-A Machine Translation (Year: 2015).*
JP-2014213688-A Machine Translation (Year: 2014).*
Extended European Search Report issued May 18, 2022, in European Application No. 21210383.2.

* cited by examiner

PNEUMATIC TIRE

CROSS-REFERENCE TO RELATED APPLICATIONS

This application claims the benefit of foreign priority to Japanese Patent Applications No. JP2020-215292, filed Dec. 24, 2020, wherein the entire content and disclosure of which are incorporated by reference in their entirety.

FIELD

The present disclosure relates to a pneumatic tire.

BACKGROUND

The following Patent Document 1 has proposed a pneumatic tire having a convex pattern on sidewall portions. The above-mentioned pneumatic tire has a non-black rubber layer inside the sidewall portions, and a part of the non-black rubber layer is exposed in a raised surface of the convex pattern.

PRIOR ART

Patent Document

Patent Document 1

Japanese Unexamined Patent Application Publication No. 2016-203420

SUMMARY

The pneumatic tire disclosed in Patent document 1 is expected to improve the appearance by an exposed different color rubber layer.

However, it is possible that the above-mentioned different color rubber layer is prone to discoloration due to migration of rubber compounding agents such as an anti-aging agent from the surrounding rubber members. In particular, in recent years, the sidewall portions have become thinner and thinner, therefore, the rubber compounding agents in the topping rubber of the carcass tend to migrate to the different color rubber layer, thereby, the discoloration described above tends to occur.

SUMMARY

According to an aspect a pneumatic tire can comprise: a tread portion; a pair of sidewall portions; a pair of bead portions; and a carcass extending from one of the bead portions to another one of the bead portions. At least one of the sidewall portions can include a first sidewall rubber arranged outside the carcass in a tire axial direction. The first sidewall rubber can include a different color rubber layer and a barrier rubber layer. The different color rubber layer can have a color different from a basic color of an outer surface of the at least one of the sidewall portions. At least a part of the different color rubber layer can be exposed in the outer surface of the at least one of the sidewall portions. The barrier rubber layer can be arranged between the different color rubber layer and the carcass. The barrier rubber layer can include a first portion having a rubber compounding to suppress migration of rubber compounding agents on a carcass side to the different color rubber layer.

DETAILED DESCRIPTION

An object of one or more embodiments of the disclosed subject matter, among one or more objects, can be to suppress discoloration of a different color rubber layer in a pneumatic tire with the different color rubber layer exposed in the outer surface of the sidewall portion.

The present disclosure can involve a pneumatic tire including a tread portion, a pair of sidewall portions, a pair of bead portions, and a carcass extending from one of the bead portions to the other one of the bead portions, wherein, at least one of the sidewall portions includes a first sidewall rubber arranged outside the carcass in a tire axial direction, the first sidewall rubber includes a different color rubber layer and a barrier rubber layer, the different color rubber layer has a color different from a basic color of an outer surface of the at least one of the sidewall portions, at least a part of the different color rubber layer is exposed in the outer surface of the at least one of the sidewall portions, the barrier rubber layer is arranged between the different color rubber layer and the carcass, and the barrier rubber layer includes a first portion having a rubber compounding to suppress migration of rubber compounding agents on the carcass side to the different color rubber layer.

Pneumatic tires of one or more embodiments of the present disclosure, such as those adopting the above configuration, can suppress discoloration of the different color rubber layer.

An embodiment of the present disclosure will now be described in detail in conjunction with accompanying drawings.

Figure 1:
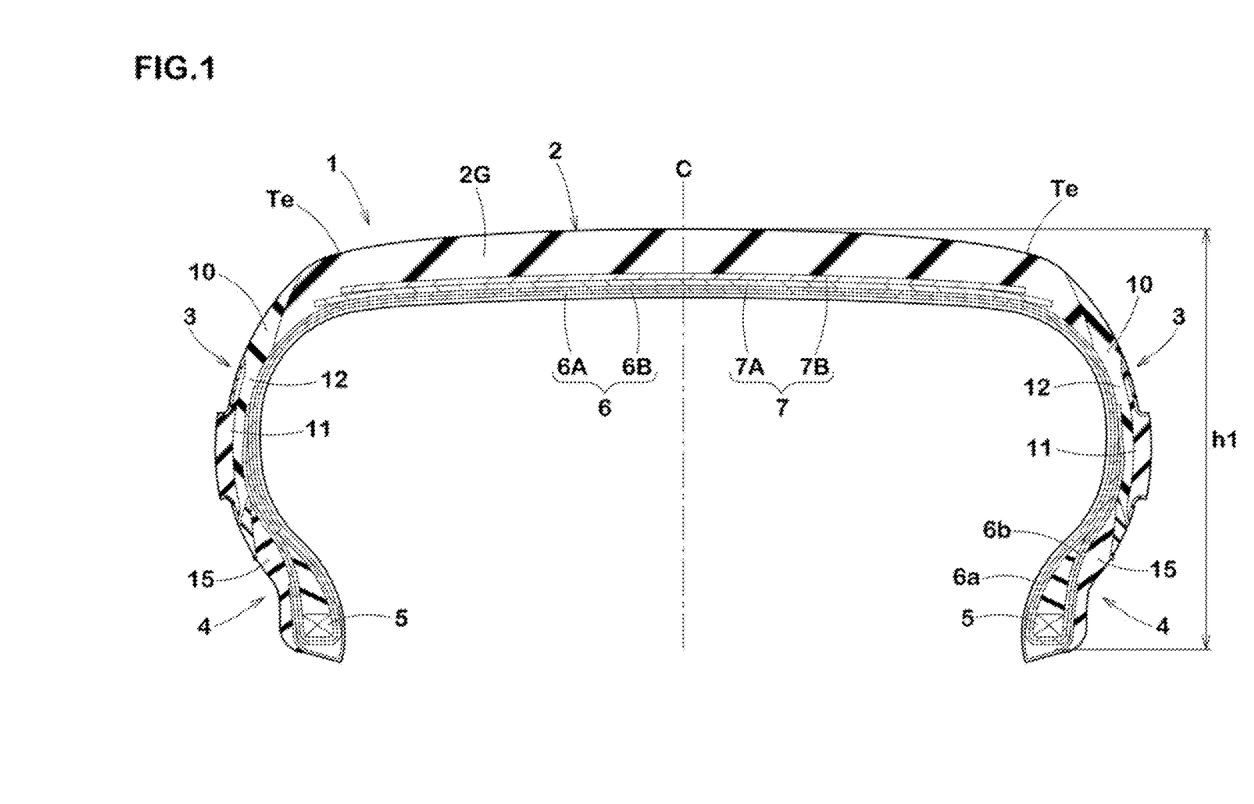
FIG. 1 is a lateral cross-sectional view showing a tire according to an embodiment of the present disclosure.

FIG. 1 shows a lateral cross-sectional view of a pneumatic tire (hereinafter may be referred to simply as "tire") 1 of the present embodiment in a standard state. It should be noted that FIG. 1 shows a so-called tire meridian section passing through a rotational axis of the tire. As shown in FIG. 1, the tire 1 of the present embodiment can be a tire for passenger cars, and can be a relatively low and flat tire having a tire section height (h1) of 120 mm or less, for example. However, the present disclosure is not limited to such an embodiment.

In the case of pneumatic tires for which various standards are specified, the "standard state" can be referred to or characterized as a state in which the tire is mounted on a standard rim, inflated to a standard inner pressure, and loaded with no tire load. In the case of tires for which various standards are not specified, the standard state can refer to a standard operating condition of the tire according to an intended use thereof, which can mean a state in which the tire is not mounted on a vehicle and loaded with no tire load. In the present specification, unless otherwise noted, the dimensions and the like of various parts of the tire are the values measured in the standard state described above.

The "standard rim" can be referred to or characterized as a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" can be referred to or characterized as air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The tire section height (hl) can be referred to or characterized as a height in a tire radial direction of the tire 1 in the standard state from a bead baseline. Further, the bead baseline can be a tire axial line passing through the rim diameter position defined by the standard on which the tire is based.

The tire 1 of the present embodiment can include a tread portion 2, a pair of sidewall portions 3, a pair of bead portions 4, and a carcass 6 extending from one of the bead portions 4 to the other one of the bead portions 4.

The carcass 6 can be formed by two carcass plies 6A and 6B, for example. Each of the carcass plies 6A and 6B can include a plurality of carcass cords and a topping rubber covering the carcass cords, for example. The carcass cords can be arranged at an angle of 75 degrees or more and 90 degrees or less with respect to a tire circumferential direction, for example. For the carcass cords, organic fiber cords and the like such as nylon, polyester, rayon, and the like, for example, can be suitably employed.

The carcass 6 can have a main body portion (6a) and turned up portions (6b). The main body portion (6a) can extend between bead cores 5 of a pair of the bead portions 4. The turned up portions (6b) can be connected to the main body portion (6a) and can each be turned up around a respective one of the bead cores 5, for instance, to extend outward in the tire radial direction. Each of the turned up portions (6b) of the present embodiment can be turned up around a respective one of the bead cores 5 from inside to outside in a tire axial direction. Further, in each of the turned up portions (6b), an outer end of the carcass ply (6A) can be displaced in the tire radial direction from an outer end of the carcass ply (6B).

In the tread portion 2 of the present embodiment, a belt layer 7 can be arranged radially outside the carcass 6, for example. The belt layer 7 can include two belt plies 7A and 7B, for example. Each of the belt plies 7A and 7B can include belt cords arranged at an angle with respect to the tire circumferential direction and a topping rubber covering the belt cords, for example. It can be preferred that each of the belt cords is inclined, for instance, at an angle of 10 degrees or more and 45 degrees or less with respect to the tire circumferential direction.

The tread portion 2 can include a tread rubber 2G. Each of the bead portions 4 can include a clinch rubber 15 forming an outer surface of a respective one of the bead portions. At least one (both in the present embodiment) of the sidewall portions 3 can include a first sidewall rubber 10 arranged axially outside the carcass 6.

Figure 2:
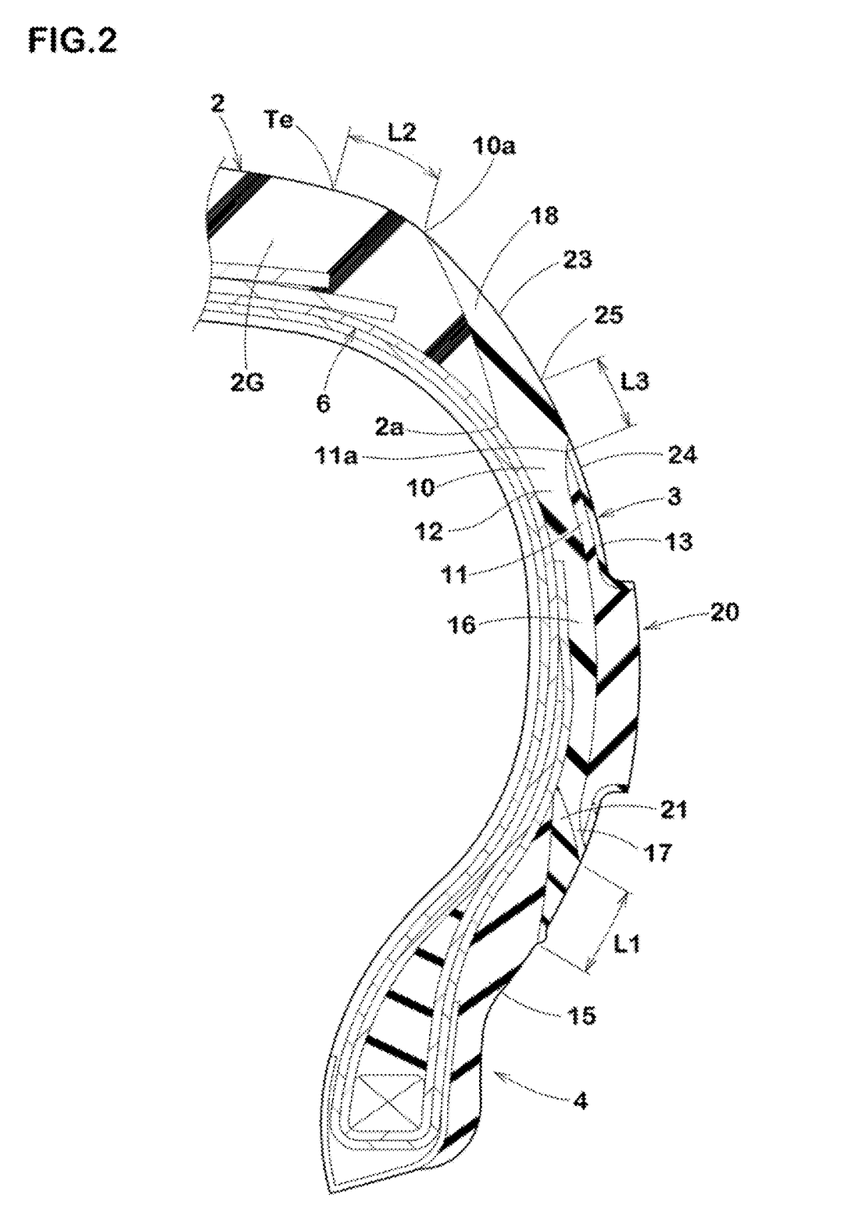
FIG. 2 is an enlarged cross-sectional view of one of the sidewall portions of FIG. 1.

An enlarged cross-sectional view of one of the sidewall portions 3 is shown in FIG. 2. As shown in FIG. 2, further, the first sidewall rubber 10 can include a different color rubber layer 11, and a barrier rubber layer 12.

The different color rubber layer 11 can have a color (e.g., white in the present embodiment) different from the basic color (e.g., black in the present embodiment) of the outer surface of the sidewall portions 3, and at least a part of the different color rubber layer 11 can be exposed in the outer surface of a respective one of the sidewall portions 3. In the present embodiment, most of the different color rubber layer 11 can be covered by a cover rubber layer 13 having the basic color mentioned above, and a part of the different color rubber layer 11 can be exposed to form letters, marks, and figures.

Figure 3:
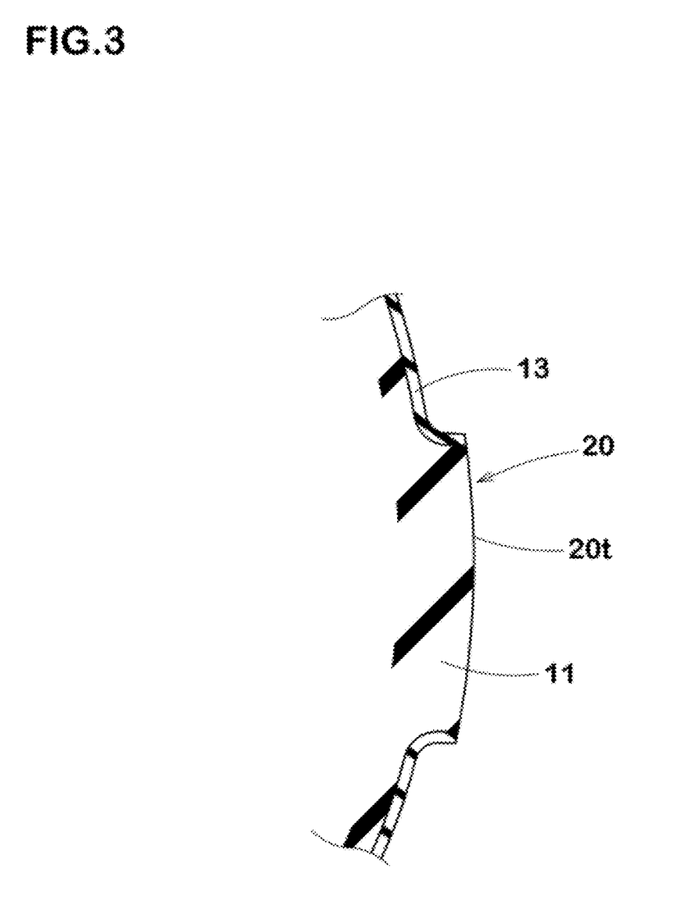
FIG. 3 is an enlarged view of a raised portion of FIG. 2.

FIG. 3 shows an enlarged cross-sectional view of the area where the different color rubber layer 11 is exposed (raised area). In the present embodiment, a raised portion 20 can be provided on the outer surface of each of the sidewall portions 3, and the different color rubber layer 11 can be exposed in a top surface (20t) positioned on an outer side in the tire axial direction. In the manufacturing method of the tire 1 of the present embodiment, for example, a portion of the sidewall portions 3 including the different color rubber layer 11 covered with the cover rubber layer 13 can be placed into the recess of the corresponding vulcanization mold to form the raised portion 20, and then the top surface of the raised portion 20 can be buffed so that the different color rubber layer 11 is exposed. Such a manufacturing method may be known to the public and can be suitably applied to the tire 1 of the present embodiment.

In the present disclosure, it can be sufficient that the different color rubber layer 11 is exposed, and the present disclosure may be applied to tires that are not provided with the raised portion 20 described above.

As shown in FIG. 2, the barrier rubber layer 12 can be arranged between the different color rubber layer 11 and the carcass 6, and can have a first portion 16 including a rubber compounding to suppress migration of the rubber compounding agents on the carcass 6 side to the different color rubber layer 11. By adopting the above configuration, in the present disclosure, it can be possible that discoloration of the different color rubber layer 11 can be suppressed. The following mechanisms can be inferred as reasons for the above.

Conventionally, the different color rubber layer 11 may tend to discolor and spoil the appearance of the sidewall portions 3 due to the migration of the rubber compounding agents such as anti-aging agents from the surrounding rubber material and the influence of ultraviolet rays and so on. As a result of intensive research, the inventors found that the discoloration was largely due to the rubber compounding agents contained in the topping rubber of the carcass 6. Further, it was also found that the distance between the carcass 6 and the different color rubber layer 11 was smaller in recent years due to the thinner sidewall portions, therefore, the effect of the topping rubber of the carcass 6 was more significant. In one or more embodiments of the present disclosure, it is presumed that the first portion 16 of the barrier rubber layer 12 described above can suppress the migration of the rubber compounding agents from the topping rubber of the carcass 6, therefore, the discoloration of the different color rubber layer 11 can be effectively suppressed.

The more detailed configuration of the present embodiment will be described below. It should be noted that each of the configurations described below can represent a specific form of the present embodiment. Therefore, it goes without saying that the present disclosure can exert the above-mentioned effects even if it does not have the configuration described below. Further, even if any one of the configurations described below is applied alone to the tire of one or more embodiments of the present disclosure having the above-mentioned features, the performance can be expected to be improved according to each configuration. Furthermore, when some of the configurations described below are applied in combination, the combined improvement of performance according to each configuration can be expected.

The barrier rubber layer 12 can be formed entirely of the same (uniform) rubber compounding. The rubber compounding of the barrier rubber layer 12 can include butyl-based rubber, for example. Butyl-based rubbers can exhibit extremely low air permeability and can effectively inhibit the migration of rubber compounding agents. On the other hand, if the rubber layer containing butyl-based rubber comes into contact with the rim, the rim may be corroded. From such a point of view, it can be preferred that the barrier rubber layer 12 includes 60% or less of butyl-based rubber, and it is more preferred that the barrier rubber layer 12 includes 40% or more and 60% or less of butyl-based rubber.

Further, it can be preferred that the barrier rubber layer 12 can contain at least one of inorganic clay minerals such as kaolin clay, clay, mica, feldspar, and a hydrous complex of silica and alumina. Thereby, the aforementioned migration of the rubber compounding agents can be further suppressed. It should be noted that the known rubber compounding can be applied to the barrier rubber layer 12 of one or more embodiments of the present disclosure.

The first sidewall rubber 10 can include an inner rubber portion 21 that can be in contact with the clinch rubber 15 of the bead portion 4. The inner rubber portion 21 can be formed of a rubber compounding of common sidewall rubber. Thereby, durability near a boundary between the first sidewall rubber 10 and the clinch rubber 15 can be improved. In addition, from the point of view of ensuring sufficient durability, a length L1 of the inner rubber portion 21 along the outer surface of the sidewall portion 3 or the bead portion 4 in the tire meridian section can be 10 mm or more, and preferably 10 mm or more and 30 mm or less.

Further, the barrier rubber layer 12 can include a second portion 17 arranged between the inner rubber portion 21 and the different color rubber layer 11. The second portion 17 can be provided with the rubber compounding for suppressing the migration of the rubber compounding agents of the inner rubber portion 21 to the different color rubber layer 11. Thereby, the migration of the rubber compounding agents from the inner rubber portion 21 to the different color rubber layer 11 can be suppressed.

The barrier rubber layer 12 can include a third portion 18 arranged between the tread rubber 2G and the different color rubber layer 11. The third portion 18 can be provided with the rubber compounding for suppressing the migration of the rubber compounding agents on the tread rubber 2G side to the different color rubber layer 11. Thereby, the migration of the rubber compounding agents from the tread rubber 2G to the different color rubber layer 11 can be suppressed.

In the present embodiment, it can be preferred that an outer end (2a) in the tire axial direction of the tread rubber 2G is covered by the first sidewall rubber 10 over an entirety thereof in each of the sidewall portions 3. Thereby, the durability near a boundary between the first sidewall rubber 10, including the barrier rubber layer 12, and the tread rubber 2G can be improved.

From the same point of view, in the tire meridian section, it can be preferred that a distance L2 from an outer end (10a) in the tire radial direction of the first sidewall rubber 10 to one of tread ground contacting edges (Te) adjacent thereto can be 20 mm or more and 40 mm or less. It should be noted that the tread ground contacting edges (Te) can correspond to the axially outermost ground contact positions of the tire 1 when the tire 1 in the standard state is in contact with a flat surface with zero camber angle by being loaded with a standard tire load.

In the case of tires for which various standards are specified, the "standard tire load" can be referred to or characterized as a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. Further, in the case of tires for which various standards are not specified, the "standard tire load" can refer to the load applied to a single tire under a standard mounting condition of the tire. The "standard mounting condition" can refer to the condition in which the tires are mounted on a standard vehicle according to the intended use of the tires and the vehicle is stationary on a flat road surface in a roadworthy condition.

The different color rubber layer 11 can be in contact only with the barrier rubber layer 12 and not with any other rubber material, except for the cover rubber layer 13 covering the outer surface of the different color rubber layer 11. Thereby, it can be ensured that the migration of the rubber compounding agents can be suppressed.

The outer surface of the tire 1 can include a boundary 25 between a first outer surface 23 vulcanized in a tread mold and a second outer surface 24 vulcanized in a sidewall mold. In general, the above-described boundary 25 may tend to have a slight burr due to the rubber getting into the gap between the two molds. In other words, near the boundary 25, the movement of the rubber during vulcanization can be large. In the case of the tire 1 having a relatively small tire section height as in the present embodiment, the boundary 25 and the different color rubber layer 11 can be close to each other, therefore, there can be a possibility that the different color rubber layer 11 may be exposed at an unintended location due to the movement of the rubber near the boundary 25. In order to prevent such a problem, the different color rubber layer 11 can be arranged radially inside the boundary 25. Further, in the tire meridian section, it can be preferred that a distance L3 from the boundary 25 to an outer end (11a) in the tire radial direction of the different color rubber layer 11 can be 10 mm or more and 30 mm or less, for example.

The cover rubber layer 13 can be thick enough to prevent the different color rubber layer 11 from being exposed in unnecessary places, for example. On the other hand, if the thickness of the cover rubber layer 13 is excessively large, the workability of the buffing process described above may be decreased. From such a point of view, it can be preferred that the thickness of the cover rubber layer 13 can be 0.5 mm or more and 1.0 mm or less.

In a more preferred embodiment, the cover rubber layer 13 can be formed of the same rubber compounding as the barrier rubber layer 12. Thereby, peeling off of the cover rubber layer 13 can be suppressed.

While detailed description has been made of the pneumatic tire according to an embodiment of the present disclosure, the present disclosure can be embodied in various forms without being limited to the illustrated embodiment.

EXAMPLES

Pneumatic tires of size 225/50R18 having the basic structure shown in FIG. 1 were made by way of test according to the specifications in Table 1. As Reference, pneumatic tires each not having the barrier rubber layer arranged between the carcass and the different color rubber layer were made by way of test. The tires in the Reference had substantially the same configuration as the tires in Examples, except for the points mentioned above. For each of the test tires, discoloration resistance performance of the different color rubber layer was tested. The common specifications and the test methods for each of the test tires were as follows.
Tire rim: 18×7.0 J
Tire inner pressure: 220 kPa Discoloration Resistance Performance of Different Color Rubber Layer The test tires were run on a drum testing machine for 18 hours at a speed of 80 km/h under a constant longitudinal load. Further, during this run, the part of the sidewall portion where the different color rubber layer was exposed was continuously irradiated with UV light by using a black light. After the above run, the degree of discoloration of the exposed part of the different color rubber layer was visually evaluated. The results are shown on a 5-point scale from 1 to 5, wherein the higher the score, the better the discoloration resistance performance is.

The test results are shown in Table 1.

TABLE 1

| | | Ref. 1 | Ex. 1 | Ex. 2 | Ex. 3 | Ex.4 | Ex. 5 | Ex. 6 | Ex. 7 | Ex. 8 | Ex. 9 |
|---|---|---|---|---|---|---|---|---|---|---|---|
| Presence (P) or Absence (A) of Barrier rubber layer | | A | P | P | P | P | P | P | P | P | P |
| Length L1 of Inner rubber portion | [mm] | 10 | 10 | 5 | 15 | 10 | 10 | 10 | 10 | 5 | 5 |
| Distance L2 from Tread edge to Outer end of First sidewall rubber | [mm] | 30 | 30 | 30 | 30 | 20 | 40 | 30 | 30 | 20 | 30 |
| Distance L3 from Boundary to Different color rubber layer | [mm] | 10 | 10 | 10 | 10 | 10 | 50 | 5 | 15 | 10 | 5 |
| Discoloration resistance performance of Different color rubber layer | [evaluation point] | 1 | 5 | 4 | 5 | 4 | 5 | 4 | 5 | 4 | 3 |

From the test results, the tires in the Examples had the discoloration resistance performance of 4 to 5 points for the differently colored rubber layer, therefore, it was confirmed that the tires in the Examples effectively suppressed the discoloration of the different color rubber layer.

Statement of Disclosure

The present disclosure, including one or more embodiments thereof, can include the following aspects.

Present Disclosure 1

A pneumatic tire including:
a tread portion;
a pair of sidewall portions;
a pair of bead portions; and
a carcass extending from one of the bead portions to the other one of the bead portions,
wherein, at least one of the sidewall portions includes a first sidewall rubber arranged outside the carcass in a tire axial direction,
the first sidewall rubber includes a different color rubber layer and a barrier rubber layer,
the different color rubber layer has a color different from a basic color of an outer surface of the at least one of the sidewall portions,
at least a part of the different color rubber layer is exposed in the outer surface of the at least one of the sidewall portions,
the barrier rubber layer is arranged between the different color rubber layer and the carcass, and
the barrier rubber layer includes a first portion having a rubber compounding to suppress migration of rubber compounding agents on the carcass side to the different color rubber layer.

Present Disclosure 2

The pneumatic tire according to Present disclosure 1, wherein
each of the bead portions includes a clinch rubber forming an outer surface of a respective one of the bead portions,
the first sidewall rubber includes an inner rubber portion in contact with the clinch rubber,
the barrier rubber layer is arranged between the inner rubber portion and the different color rubber layer, and
the barrier rubber layer includes a second portion having a rubber compounding to suppress migration of rubber compounding agents in the inner rubber portion to the different color rubber layer.

Present Disclosure 3

The pneumatic tire according to Present disclosure 1, wherein
the barrier rubber layer is arranged between the different color rubber layer and a tread rubber forming the tread portion, and
the barrier rubber layer includes a third portion having a rubber compounding to suppress migration of rubber compounding agents on the tread rubber side to the different color rubber layer.

Present Disclosure 4

The pneumatic tire according to Present disclosure 3, wherein
in a tire meridian section, a distance from an outer end in a tire radial direction of the first sidewall rubber to one of tread ground contacting edges adjacent to the first sidewall rubber is 20 mm or more and 40 mm or less.

Present Disclosure 5

The pneumatic tire according to Present disclosure 1 further comprising:
a first outer surface vulcanized in a tread mold;
a second outer surface vulcanized in a sidewall mold; and
a boundary between the first outer surface and the second outer surface, wherein
the different color rubber layer is arranged inside the boundary in a tire radial direction, and
in a tire meridian section, a distance from the boundary to an outer end in the tire radial direction of the different color rubber layer is 10 mm or more and 30 mm or less.

Present Disclosure 6

The pneumatic tire according to Present disclosure 1, wherein
the tread portion includes a tread rubber, and
the tread rubber has an outer end in the tire axial direction covered by the first sidewall rubber.

Present Disclosure 7

The pneumatic tire according to Present disclosure 1, wherein a tire section height is 120 mm or less.

Present Disclosure 8

The pneumatic tire according to Present disclosure 1, wherein the barrier rubber layer includes 60% or less of butyl-based rubber.

DESCRIPTION OF REFERENCE SIGNS

2 tread portion
3 sidewall portion
4 bead portion
6 carcass
10 first sidewall rubber
11 different color rubber layer
12 barrier rubber layer
16 first portion

The invention claimed is:

1. A pneumatic tire comprising:
a tread portion;
a pair of sidewall portions;
a pair of bead portions; and
a carcass extending from a first of the bead portions to a second of the bead portions,
wherein, at least one of the sidewall portions includes a first sidewall rubber arranged outside the carcass in a tire axial direction,
the first sidewall rubber includes a different color rubber layer and a barrier rubber layer,
the different color rubber layer has a color different from a basic color of an outer surface of the at least one of the sidewall portions,
at least a part of the different color rubber layer is exposed in the outer surface of the at least one of the sidewall portions,
the barrier rubber layer extends from the different color rubber layer to the carcass,
the barrier rubber layer includes a first portion having a rubber compounding to suppress migration of rubber compounding agents on the carcass side to the different color rubber layer,
the barrier rubber layer is between the different color rubber layer and a tread rubber forming the tread portion,
the barrier rubber layer includes a third portion having the rubber compounding to suppress migration of the rubber compounding agents on the tread rubber side to the different color rubber layer, and
the third portion extends from the tread rubber to the different color rubber layer,
each of the bead portions includes a clinch rubber forming an outer surface of a respective one of the bead portions,
the first sidewall rubber includes an inner rubber portion in contact with the clinch rubber,
the barrier rubber layer is between the inner rubber portion and the different color rubber layer, and
the barrier rubber layer includes a second portion having the rubber compounding to suppress migration of the rubber compounding agents in the inner rubber portion to the different color rubber layer.

2. The pneumatic tire according to claim 1, wherein
in a tire meridian section, a distance along an outer surface of the tread portion and the outer surface of the at least one of the sidewall portions from an outer end in a tire radial direction of the first sidewall rubber to one of tread ground contacting edges adjacent to the first sidewall rubber is 20 mm or more and 40 mm or less,
the first sidewall rubber consists of the different color rubber layer, the barrier rubber layer, and the inner rubber portion, and
a radially outer end of the third portion of the barrier layer is located radially outside a radially outer end of the carcass and axially inside an axially outer end of the carcass.

3. The pneumatic tire according to claim 1, wherein the tread rubber has an outer end in the tire axial direction covered by the first sidewall rubber.

4. The pneumatic tire according to claim 1, wherein a tire section height is 120 mm or less.

5. The pneumatic tire according to claim 1, wherein the barrier rubber layer includes 60% or less of butyl-based rubber.

6. The pneumatic tire according to claim 1, wherein a length of the inner rubber portion along the outer surface of the at least one of the sidewall portions or one of the bead portions adjacent to the at least one of the sidewall portions is 5 mm or more and 30 mm or less in a tire meridian section.

7. The pneumatic tire according to claim 6, wherein the length of the inner rubber portion is 10 mm or more and 30 mm or less.

8. The pneumatic tire according to claim 1 further comprising:
a first outer surface vulcanized in a tread mold and including an outer surface of the tread portion and outer surfaces of outer parts in a tire radial direction of the sidewall portions;
a pair of second outer surfaces vulcanized in sidewall molds; and
a pair of boundaries each defined between the first outer surface and a respective one of the second outer surfaces and including a burr, wherein
the entire different color rubber layer is located radially inside one of the boundaries of the at least one of the sidewall portions, and
in a tire meridian section, a distance along the outer surface of the at least one of the sidewall portions from the one of the boundaries of the at least one of the sidewall portions to an outer end in the tire radial direction of the different color rubber layer is 10 mm or more and 30 mm or less.

9. The pneumatic tire according to claim 8, wherein
the outer surface of the at least one of the sidewall portions has a raised portion,
the raised portion has a top surface located on an outer side in the tire axial direction,
the different color rubber layer is exposed in the top surface,
the different color rubber layer has an extension extending radially outward under the outer surface of the at least one of the sidewall portions from a portion of the different color rubber layer included in the raised portion, and in a tire meridian section, the extension has a length along the outer surface of the at least one of the sidewall portions larger than a distance along the outer surface of the at least one of the sidewall portions from one of the boundaries of the at least one of the sidewall portions to the outer end in a tire radial direction of the different color rubber layer.

10. The pneumatic tire according to claim 1, wherein the different color rubber layer has an axially outer surface covered by a cover rubber layer except for the at least a part exposed in the outer surface of the at least one of the sidewall portions, and the different color rubber layer is in contact only with the barrier rubber layer and not with any other rubber material, except for the cover rubber layer.

11. The pneumatic tire according to claim 10, wherein the cover rubber layer has a thickness of 0.5 mm or more and 1.0 mm or less.

12. The pneumatic tire according to claim 10, wherein the cover rubber layer is formed of the same rubber compounding as the barrier rubber layer.

13. The pneumatic tire according to claim 5, wherein the barrier rubber layer includes 40% or more of the butyl-based rubber.

14. The pneumatic tire according to claim 5, wherein the barrier rubber layer is formed entirely of a uniform rubber compounding.

15. The pneumatic tire according to claim 5, wherein the barrier rubber layer contains an inorganic clay mineral including at least one of kaolin clay, clay, mica, feldspar, and a hydrous complex of silica and alumina.

16. The pneumatic tire according to claim 1, wherein the rubber compounding agents include an anti-aging agent.

17. The pneumatic tire according to claim 1, wherein
the carcass is formed by a pair of carcass plies,
the carcass includes a main body portion and a pair of turned up portions,
the main body portion extends between bead cores of the bead portions, one bead core in each of the bead portions,
each of the turned up portions is connected with the main body portion and turned up around a respective one of the bead cores to extend outward in a tire radial direction, and
in each of the turned up portions, outer ends of the carcass plies are displaced in the tire radial direction from each other.

18. A pneumatic tire comprising:
a tread portion;
a pair of sidewall portions;
a pair of bead portions;
a carcass extending from a first of the bead portions to a second of the bead portions;
a first outer surface vulcanized in a tread mold and including an outer surface of the tread portion and outer surfaces of outer parts in a tire radial direction of the sidewall portions;

a pair of second outer surfaces vulcanized in sidewall molds; and a pair of boundaries each defined between the first outer surface and a respective one of the second outer surfaces and including a burr, wherein, at least one of the sidewall portions includes a first sidewall rubber arranged outside the carcass in a tire axial direction, the first sidewall rubber includes a different color rubber layer and a barrier rubber layer, the different color rubber layer has a color different from a basic color of an outer surface of the at least one of the sidewall portions, at least a part of the different color rubber layer is exposed in the outer surface of the at least one of the sidewall portions, the barrier rubber layer extends from the different color rubber layer to the carcass, the barrier rubber layer includes a first portion having a rubber compounding to suppress migration of rubber compounding agents on the carcass side to the different color rubber layer, the barrier rubber layer is between the different color rubber layer and a tread rubber forming the tread portion, the barrier rubber layer includes a third portion having the rubber compounding to suppress migration of the rubber compounding agents on the tread rubber side to the different color rubber layer, the third portion extends from the tread rubber to the different color rubber layer, the entire different color rubber layer is located radially inside one of the boundaries of the at least one of the sidewall portions, in a tire meridian section, a distance along the outer surface of the at least one of the sidewall portions from the one of the boundaries of the at least one of the sidewall portions to an outer end in the tire radial direction of the different color rubber layer is 10 mm or more and 30 mm or less, the outer surface of the at least one of the sidewall portions has a raised portion, the raised portion has a top surface located on an outer side in the tire axial direction, the different color rubber layer is exposed in the top surface, the different color rubber layer has an extension extending radially outward under the outer surface of the at least one of the sidewall portions from a portion of the different color rubber layer included in the raised portion, and in the tire meridian section, the extension has a length along the outer surface of the at least one of the sidewall portions larger than a distance along the outer surface of the at least one of the sidewall portions from one of the boundaries of the at least one of the sidewall portions to the outer end in the tire radial direction of the different color rubber layer.

\* \* \* \* \*